(12) United States Patent
Li

(10) Patent No.: US 6,620,543 B2
(45) Date of Patent: Sep. 16, 2003

(54) ELECTROCHEMICAL CELL HAVING CAN VENT AND COVER TERMINAL

(75) Inventor: Huaxin Li, Broadview Heights, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 180 days.

(21) Appl. No.: 09/925,196

(22) Filed: Aug. 9, 2001

(65) Prior Publication Data

US 2003/0031918 A1 Feb. 13, 2003

(51) Int. Cl.$^7$ ................................. H01M 2/12
(52) U.S. Cl. ..................... 429/53; 429/72; 429/82; 429/224; 429/229
(58) Field of Search .................. 429/53, 72, 82, 429/224, 229

(56) References Cited

U.S. PATENT DOCUMENTS

| | | | |
|---|---|---|---|
| 4,690,879 A | * 9/1987 | Huhndorff et al. | 429/61 |
| 4,698,282 A | 10/1987 | Mantello | 429/56 |
| 4,842,965 A | 6/1989 | Urushiwara et al. | 429/56 |
| 5,667,912 A | 9/1997 | Georgopoulos | 429/170 |
| 6,022,635 A | 2/2000 | O'Hara, III et al. | 429/56 |
| 6,270,919 B1 | * 8/2001 | Janmey | 429/56 |
| 6,348,281 B1 | * 2/2002 | Li | 429/53 |

FOREIGN PATENT DOCUMENTS

| | | | |
|---|---|---|---|
| JP | 10188934 | 7/1998 | ............ H01M/2/12 |
| JP | 00258356 | 9/2000 | ............ H01M/2/12 |
| WO | 9905730 | 4/1999 | ............ H01M/2/04 |

OTHER PUBLICATIONS

D1 Can Battery Case Specification, Matsushita Battery Industrial Co., Ltd. Material Division, Jun. 1998, 4 pages.

* cited by examiner

Primary Examiner—Carol Chaney
Assistant Examiner—Dah Wei D. Yuan
(74) Attorney, Agent, or Firm—Russell H. Toye, Jr.

(57) ABSTRACT

An electrochemical cell has a can having a first end, a second end, a side wall extending between the first and second ends, and an end wall extending across the first end. Positive and negative electrodes and an electrolyte are disposed in the can. A pressure relief mechanism is formed in the end wall of the can for releasing internal pressure from within the container when the internal pressure becomes excessive. A cover is positioned on the end wall of the can to be in electrical contact therewith and extends over the pressure relief mechanism. The cover includes a protruding nubbin, a peripheral flange, and upstanding wall between the nubbin and flange. The cover is engaged with the end wall of the can at a location near the upstanding wall.

23 Claims, 3 Drawing Sheets

ELECTROCHEMICAL CELL HAVING CAN VENT AND COVER TERMINAL

BACKGROUND OF THE INVENTION

The present invention generally relates to electrochemical cells, i.e., batteries, and, more particularly, to a primary alkaline zinc/manganese dioxide electrochemical cell having a pressure relief mechanism formed in the cell can for venting when exposed to excessive pressure.

Conventional alkaline electrochemical cells generally include a cylindrical steel can having a closed bottom end, an open top end, and a cylindrical side wall extending between the top and bottom ends. Contained within the can is a positive electrode, referred to as the cathode, which typically comprises manganese dioxide as the active material. Also contained within the can is a negative electrode, referred to as the anode, which typically comprises zinc as the active material. In bobbin-type cell constructions, the cathode is typically formed against the interior surface of the steel can, while the anode is generally centrally disposed in the can. In jellyroll-type cell constructions, the anode and cathode are spirally wound. A separator is located between the anode and the cathode, and an alkaline electrolyte solution simultaneously contacts the anode, the cathode, and the separator. A conductive current collector is commonly inserted into the anode active material, and a collector and seal assembly, which typically includes an annular polymeric seal, an inner metal cover, a current collector, and an outer cover, provides closure to the open top end of the steel can to seal the active electrochemical materials in the sealed volume of the can.

Cylindrical alkaline electrochemical cells are commonly sealed closed by placing the annular polymeric (e.g., nylon) seal in the open end of the steel can and crimping the upper end of the can radially inwardly and over the outer periphery of the seal to compress the seal against the can. However, electrochemical cells commonly employ electrochemically active materials, such as zinc, which generate hydrogen gas and other gases during storage and sometimes during or following service use. With the cell can sealed closed, excessive build-up of high pressure gases within the sealed can may cause damage to the cell and/or the device in which the cell is employed. Thus, it is desirable to provide a controlled vent mechanism that vents highly pressurized gases from within the can to prevent the pressurized gases from reaching extreme levels that may cause the can to uncrimp and release electrolyte solution and particulate matter.

One widely acceptable approach to venting excessive pressurized gases has included the use of a vent formed in the annular polymeric seal of the collector and seal assembly, which is intended to rupture upon experiencing an excessive pressure build-up within the sealed volume of the cell. For example, U.S. Pat. No. 5,667,912 discloses a current collector assembly having a seal with a thinned portion which is intended to shear when the internal pressure exceeds a predetermined pressure limit. Conventional ventable seals of this type typically employ a circular thinned region formed in the annular polymeric seal. However, the amount of space generally occupied by the annular seal and the corresponding current collector, inner metal cover, and outer cover, is significant. The greater the space occupied by the seal and collector assembly, the less space that there is available within the cell for the electrochemically active materials. Consequently, a reduction in the amount of electrochemically active materials provided within the cell generally results in a shorter service life for the cell. It is therefore desirable to maximize the internal volume within the electrochemical cell that is available for the electrochemically active components.

In order to minimize the space occupied by the collector and seal assembly, it has been proposed to form the pressure release mechanism in the closed bottom end of the cell can such that it is covered by the positive contact terminal, as disclosed in U.S. patent application Ser. No. 09/293,225, filed on Apr. 16, 1999, entitled "BATTERY CONSTRUCTION HAVING PRESSURE RELEASE MECHANISM" and U.S. patent application Ser. No. 09/443,573, filed on Nov. 19, 1999, entitled "BATTERY HAVING PRESSURE RELIEF MECHANISM FORMED IN CONTAINER," the disclosures of which are hereby incorporated by reference. According to this proposed approach, the positive contact terminal includes an outwardly protruding nubbin having an upstanding wall extending from a peripheral flange that is welded to the closed bottom end of the cell can. Typically, a jacket (e.g., label) is formed around the outer cylindrical wall of the can and extends over the peripheral edge of the peripheral flange of the positive contact terminal. While this approach generally reduces the amount of volume that is otherwise necessary for the collector and seal assembly, and therefore enhances the amount of usable sealed volume within the cell, a number of shortcomings may be present. It is possible that when the pressure relief mechanism vents the positive contact terminal may become separated from the closed bottom end of the can. In addition, undesirably large variability may exist in the range of vent pressures, which may result in unexpectedly high vent pressures. This may be due, at least partially, to the cover being welded to the can at a location such that the cover restricts bulging of the bottom end of the can. In addition, the jacket, which is typically shrink-wrapped onto the outer surface of the can, may also restrict the bulging of the bottom end of the can. As a consequence, variances in the vent pressure and prevention of cover separation may occur.

Accordingly, it is therefore desirable to provide for an electrochemical cell having a vent formed in the closed end of the can with a cover such that the cell is able to consistently vent pressurized gases, and further which is not susceptible to separation between the cover and the can.

SUMMARY OF THE INVENTION

The present invention improves the protective safeguards of an electrochemical cell with an enhanced pressure relief mechanism formed in the closed end of a cell container that allows for the use of a low profile seal assembly. To achieve this and other advantages, and in accordance with the purpose of the invention as embodied and described herein, the present invention provides for an electrochemical cell comprising a container having a first end, a second end, a side wall extending between the first and second ends, and an end wall extending across the first end. The cell also includes a positive electrode, a negative electrode, and an alkaline electrolyte, all disposed in the container. A pressure relief mechanism is formed in the end wall of the container for releasing internal pressure from within the container when the internal pressure becomes excessive. A cover is positioned on the end wall of the container to be in electrical contact therewith and extends over the pressure relief mechanism. The cover has a peripheral flange with a peripheral edge and a protruding nubbin having a contact surface and an upstanding wall between the contact surface and the peripheral flange. The cover is engaged with the end wall of the container at a location near the upstanding wall.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
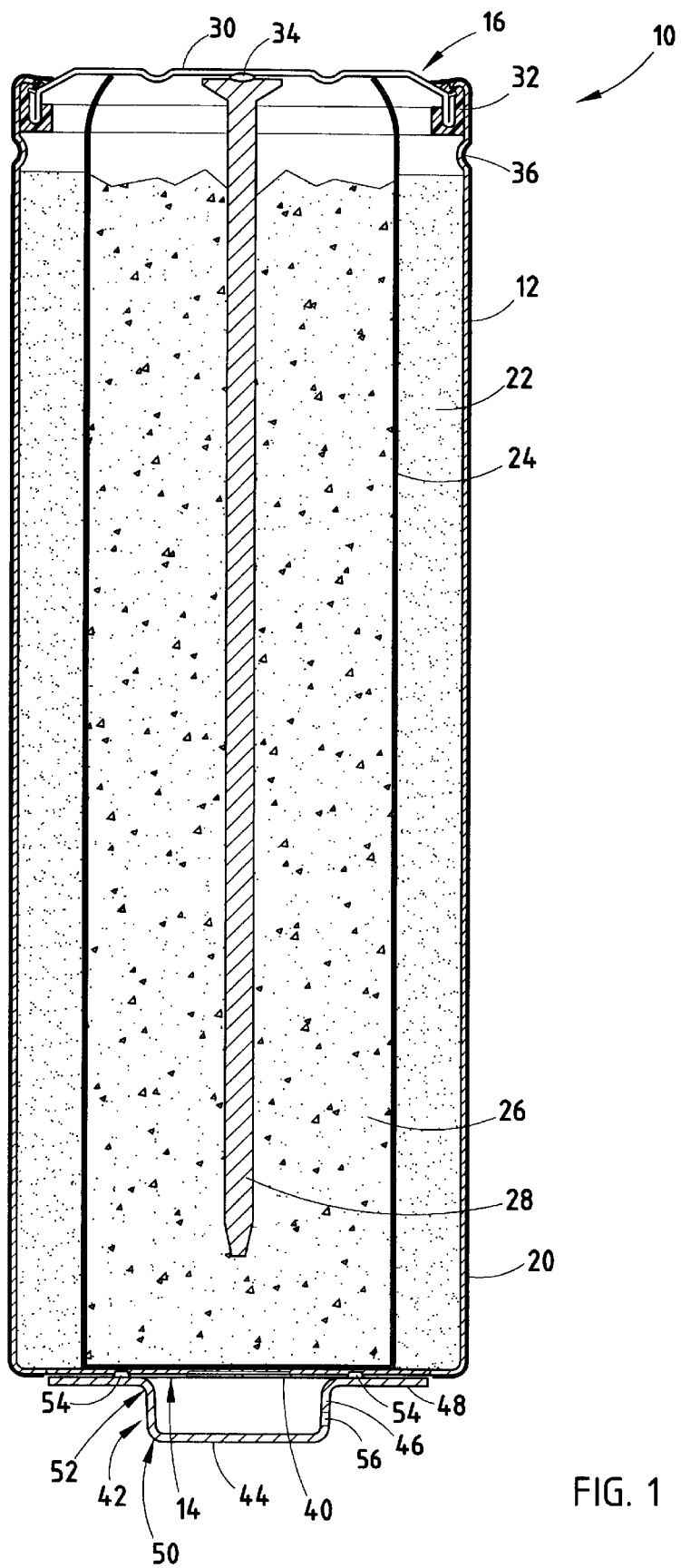
FIG. 1 is a longitudinal cross-sectional view of an electrochemical cell having a stress concentration pressure relief mechanism and contact terminal cover provided on the closed bottom end of a can according to the present invention.

Referring to FIG. 1, a cylindrical AA-size alkaline electrochemical cell 10 is shown having a stress concentration pressure relief mechanism formed in the closed bottom end of the cell can and an outer cover attached to the can bottom end according to the present invention. Electrochemical cell 10 includes a cylindrical steel can 12 having a bottom end 14 closed with an end wall, an open top end 16, and a cylindrical side wall extending between the top and bottom ends. The closed bottom end 14 of steel can 12 has a positive cover 42 welded or otherwise attached thereto and formed of plated steel, with a protruding nubbin (i.e., protrusion) 44 at its center region, which forms the positive contact terminal of cell 10. Assembled to the open top end 16 of steel can 12 is a conductive (metal) cover 30 which forms the negative contact terminal of cell 10. A jacket 20 is formed about the exterior surface of steel can 12, and is formed over the peripheral edge of the closed bottom end 14 of the can 12. The jacket 20 preferably does not extend over the peripheral edge of the positive contact terminal 42. The jacket 20 may be an adhesive label such as a metalized, plastic film label.

A cathode 22 is formed about the interior surface of steel can 12. Cathode 22 may be formed of a mixture of manganese dioxide, graphite, potassium hydroxide (KOH) solution, and additives, according to one example. A separator 24, which may be formed of a non-woven fabric that prevents migration of any solid particles in the cell, is disposed about the interior surface of cathode 22. An anode 26 is disposed with an electrolyte inside the separator 24 and in contact with a current collector 28 which may include a brass nail having an elongated body and an enlarged head at one end. The anode 26 may be formed of zinc powder, a gelling agent, and additives, according to one example. Accordingly, the cathode 22 is configured as the positive electrode, and the anode 26 is configured as the negative electrode. While a bobbin-type cell construction is shown and described herein, it should be appreciated that the electrochemical cell 10 can otherwise be configured, such as a jellyroll cell construction.

The current collector 28 contacts the negative outer cover 30 which forms the negative contact terminal of cell 10. The negative cover 30 is preferably formed of plated steel, and may be held in contact with the current collector 28 via weld 34 or pressurized contact. A ring-shaped polymeric (e.g., nylon) seal 32 having a generally J-shaped cross section is disposed in the open end of steel can 12 to provide a sealed closure between the can 12 and negative cover 30 to prevent leakage of electrochemically active cell materials contained in the steel can 12. The assembly of the seal 32 may include disposing the seal 32 in the open end 16 of steel can 12 on top of a bead 36 formed radially inward on the side wall of can 12, or alternately in a flared opening of can 12, and crimping the upper end of can 12 inwardly and over the outer periphery of the seal 32 and negative cover 30 to compress seal 32 against bead 36. Therefore, the polymeric seal 32 is compressed between the peripheral edge of negative cover 30 and the upper end wall of steel can 12. It should be appreciated that the negative cover 30 is therefore electrically insulated from the steel can 12 by way of polymeric seal 32.

According to the present invention, a stress concentration pressure relief mechanism 40 is formed in the closed bottom end 14 of steel can 12, and a positive cover 42, serving as the positive contact terminal, is connected to the bottom end wall 14 of steel can 12 so as to cover the pressure relief mechanism 40. The stress concentrator 40 may include a reduced thickness groove that has a thinned section which acts as a pressure relief mechanism for venting pressurized gases when exposed to an excessive pressure differential. The stress concentrator 40 is designed to fracture along the reduced thickness groove, which is shown herein as a generally C-shaped groove extending angularly in the shape of a circle for approximately three hundred degrees (300°), with a non-reduced section extending through an angular rotation of approximately sixty degrees (60°) so as to serve as a hinge.

The stress concentration pressure relief mechanism 40 is positioned under the positive cover 42 so as to prevent electrochemical materials from spraying directly outward from the cell 10 upon rupture. To allow for release of vented gases to the outside atmosphere, the positive cover 42 has one or more openings 56 formed in the upstanding wall 46 forming the protruding nubbin 44. Also, if the cell 10 is contacted in series with another cell such that the end of the positive cover 42 of the cell 10 is pressed against the terminal of another cell, the provision of the positive cover 42 over pressure relief mechanism 40 allows mechanism 40 to bow outwardly under the positive protrusion 44 and ultimately rupture. If the positive cover 42 was not present during such circumstances, contact between the two contacting cells may otherwise prevent the pressure relief mechanism 40 from rupturing. Further, if the positive cover 42 were not provided over pressure relief mechanism 40, the pressure relief mechanism 40 at the closed end 14 of cell 10 would be more susceptible to damage. Positive cover 42 also shields pressure relief mechanism 40 from the corrosive effects of the ambient environment and therefore reduces the possibility of premature venting and/or leakage. Thus, by forming the pressure relief mechanism 40 under the positive cover 42, problems associated with prior art constructions are overcome, and thus a commercially feasible pressure relief mechanism for a cell is realized.

Due to the formation of a pressure relief mechanism 40 in the bottom end 14 of the cell can 12, the need for a complex and voluminous collector and seal assembly is thereby eliminated, and instead the open end 16 of can 12 may be sealed using seal construction techniques that were not previously feasible in commercial cells due to the need to allow gases to escape through the pressure relief mechanism 40 to the exterior of the cell 10. The example shown of the collector and seal assembly having a seal 32 with a J-shaped cross section and negative cover 30 is only one example of a low profile collector and seal assembly that may be employed on a cell having the pressure relief mechanism 40 and cover 42 of the present invention, as other seal assemblies may be employed.

Figure 2:
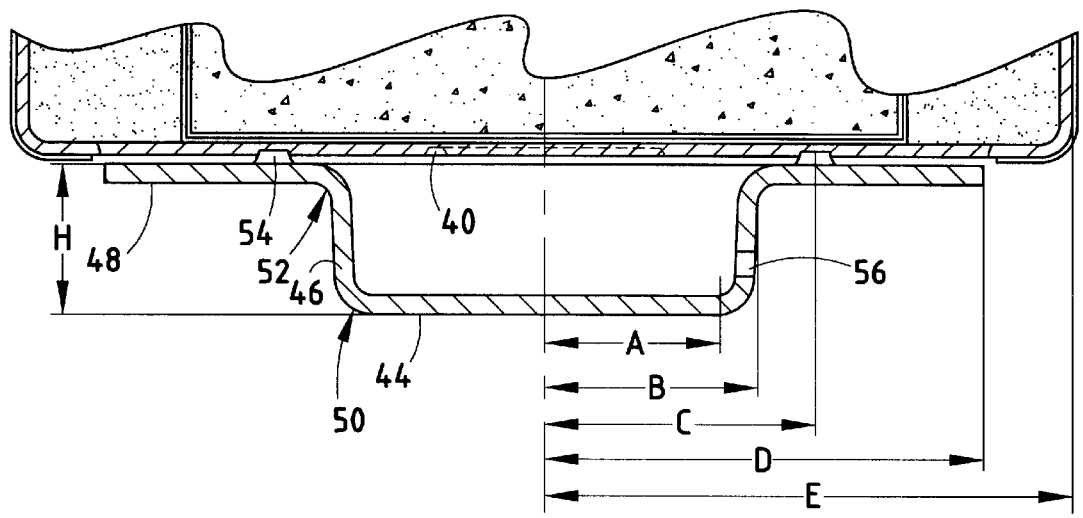
FIG. 2 is an enlarged cross-sectional view of the bottom portion of the electrochemical cell shown in FIG. 1.
Figure 3:
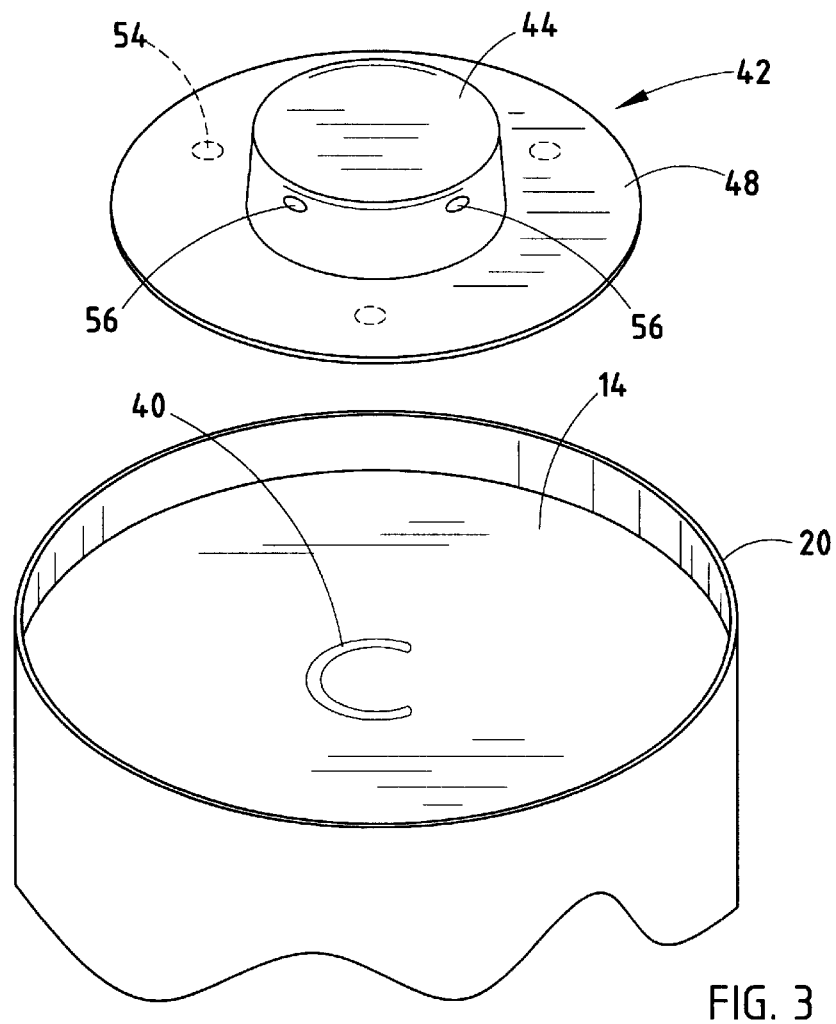
FIG. 3 is an exploded perspective view of the bottom end of the cell illustrating the cover separated from the closed end wall of the can.

Referring to FIGS. 2 and 3, the positive contact terminal (cover) 42 is shown in greater detail covering the stress concentration pressure relief mechanism 40. The stress concentration pressure relief mechanism 40 is provided by forming a groove in either the outer surface (as shown) and/or the inner surface of the bottom end wall 14 of steel can 12. The stress concentration groove 40 may be formed by punching a depressed groove in the bottom end 14 of steel can 12, such as by a press punching process, to reconfigure the bottom end 14 of steel can 12. While the stress concentrator 40 includes a C-shaped groove in the embodiment shown in FIG. 3, it should be appreciated that any one or more C-shaped or alternately configured stress concentration pressure relief grooves may be employed.

The size of the area generally circumscribed by the C-shaped groove 40 is preferably selected such that upon rupture due to excessive internal pressure within the cell 10, an area defined by the stress concentration groove 40 may pivot at a hinge and open within the positive protrusion 44 of the positive cover 42 without interference from the positive cover 42, and 10 without damaging the welds 54 attaching the positive cover 42 to the bottom end wall 14 of can 12. In general, the size of the area defined by the groove 40, as well as the selected depth of the groove, depends upon the diameter of the can 12 and the pressure at which the pressure relief mechanism 40 is intended to rupture to release internally-generated gases. The preferred venting pressure varies depending on the size of the electrochemical cell. For an AA-size cell, it is generally preferred to vent pressurized gases that reach a pressure above about 400 psi (28:1 kg/cm2), relative to a normal atmospheric pressure, and more particularly to vent gases upon reaching a pressure above about 600 psi (42.2 kg/cm2). The maximum pressure at which gases should be vented is preferably about 1800 psi (126.5 kg/cm2), and more preferably no more than about 1200 psi (84.4 kg/cm2).

The stress concentration groove 40 provides a reduced thickness in the steel can 12 sufficient to shear and thereby fracture upon experiencing a predetermined pressure differential. According to the example shown and described herein, the bottom end 14 of steel can 12 has a thickness, which may equal to approximately 0.01 inches (0.254 mm), according to one example. In comparison, the stress concentrator groove 40 may have a metal thickness of approximately 0.002 inches (0.0508 mm) to achieve a predetermined venting pressure of approximately 1,000 psi for an AA-size cell. Accordingly, the groove 40 extends to a depth equal to the difference of the can thickness minus the groove thickness. The cross section of the groove 40 may be configured as a truncated V-shaped (i.e., wedge-shaped) groove having a flat bottom surface in place of the truncated apex of the V-shaped groove, and preferably is formed at an angle preferably in the range of about ten degrees (10°) to one hundred degrees (100°).

Referring particularly to FIG. 2, the positive contact terminal 42 is shown with the protruding nubbin 44 having a substantially flat outer contact surface in a generally circular configuration. In an AA-size cell, the flat contact surface of nubbin 44 has a radius A of approximately 0.09 inches (2.286 mm). The radius A is measured from the central longitudinal axis of the cell, about which the positive contact terminal 42 is centered, to a point where the flat contact surface transitions towards the vertical upstanding wall. The positive contact terminal 42 also includes a peripheral flange 48 which lays substantially near, and could set flat up against, the bottom end 14 of steel can 12. Formed between the peripheral flange 48 and the flat contact surface of nubbin 44 is a substantially vertical upstanding wall 46 which may have an elevated rise angle of approximately one to five degrees, according to one embodiment. The upstanding wall 46 is formed about a circle having a radius B of about 0.111 inches (2.819 mm). The radius B is measured from the central longitudinal axis of the cell to the outer surface of the upstanding wall 46 at a location at the middle of the height H of positive contact terminal 42, where the height H is the overall height of the cover, excluding any weld projections. The upstanding wall 46 transitions into the peripheral flange 48 at a corner 52 having a radius equal to approximately 0.01 inches (0.254 mm). The opposite end of upstanding wall 46 transitions to the flat surface of nubbin 44 at a corner 50 with a radius of approximately 0.020 inches (0.508 mm).

The positive contact terminal 42 is attached to the bottom surface of closed end 14 of steel can 12 via a plurality of welds 54, such as three equiangularly spaced welds 54 located every one hundred twenty degrees (120°). The welds 54 preferably form weld protrusions having a depth of about 0.01 inches (0.254 mm). While three welds 54 are shown for providing both a physical connection and an electrical path between the positive contact terminal 42 and the steel can 12, it should be appreciated that other bonding techniques such as a conductive adhesive, may alternately be employed.

According to the present invention, the bonding location, such as the location of welds 54, is located substantially near the upstanding wall 46, and more particularly is near transition corner 50 between the upstanding wall 46 and the flat surface of the nubbin 44. According to the embodiment shown in FIG. 2, the welds 54 are located a distance from the center of the cell 10 at a radius C of approximately 0.140 inches (3.556 mm). The radius C is measured from the central longitudinal axis of the cell to the midpoint of the weld projection. The plurality of welds 54 are located close to the upstanding wall 46, and may be within a distance of approximately 0.02 inches (0.508 mm) of the transition corner 52. The welds 54 may, alternately, be located at the transition corner 52. Accordingly, the welds 54 are located more towards the central axis of the cell, as compared to conventional positive terminal connections. By locating the welds 54 substantially near the vertical upstanding wall 46, the bottom end wall 14 of can 12 is able to bulge more freely with reduced restraint caused by the welds, and therefore the welds 54 are less susceptible to damage caused by bulging.

The positive contact terminal 42 employs a peripheral flange 48 having an outer radius D of approximately 0.225 inches (5.715 mm). The radius D is measured from the central longitudinal axis of the cell to the outer peripheral edge of the peripheral flange 48. The peripheral flange 48 shown generally extends substantially planar from the transition corner 52 to the outer peripheral edge as shown; however, it should be appreciated that various other shapes may be provided in place of planar flange 48. In the AA-size cell shown, the steel can 12 has an outside radius E of approximately 0.274 inches (6.960 mm). The radius E is measured from the central longitudinal axis of the cell to the outer side wall of the steel can 12, at its widest point, excluding the label. According to the embodiment shown in FIG. 2, the radial distance from the center of weld 54 to the outer side wall of the upstanding wall 46 at a location midway of height H, which is C–B, is equal to 0.029 inches (0.737 mm). Additionally, the radial distance from the center of the welds 54 to the outer side wall of the steel can 12, which is E–C, is equal to 0.134 inches (3.404 mm). Accordingly, with the exterior of the upstanding wall at a radial distance B, the positive contact terminal 42 is engaged with the end wall of the steel can 12 at a location having a radial midpoint at a radial distance C, the exterior of the steel can side wall is at a radial distance E, radial distances B, C, and E are measured from the central longitudinal axis of the cell, and 1.5 times the difference C–B is equal to or less than the difference E–C.

Figure 4:
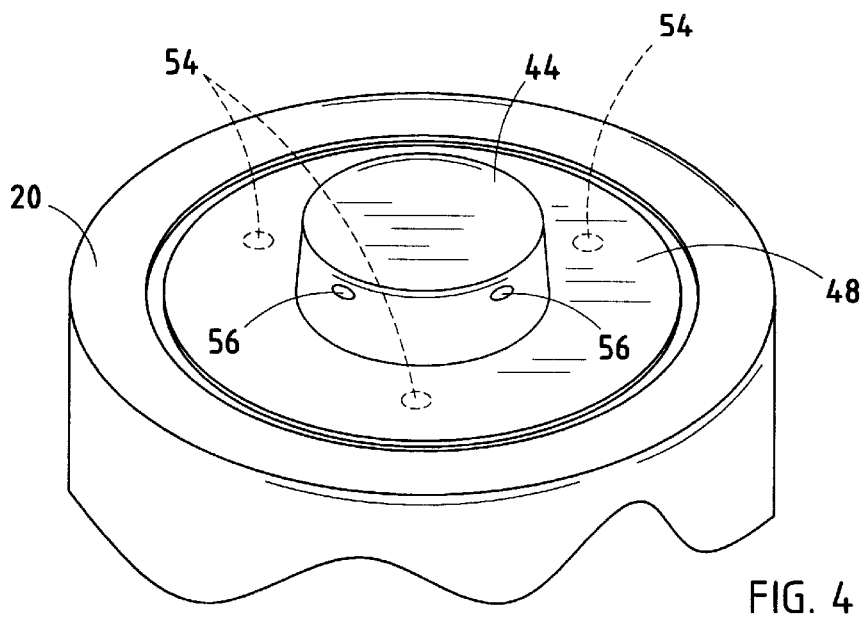
FIG. 4 is a perspective view of the bottom end of the electrochemical cell.

It should be appreciated that by employing a reduced radius peripheral flange 48, the positive contact terminal 42 of the present invention is small enough such that the jacket 20 does not interfere with the venting operation of the pressure relief mechanism 40. According to the embodiments shown, the jacket 20 extends onto a peripheral end portion of the bottom end 14 of the steel can 12, however, the jacket 20 does not extend onto and cover the peripheral flange 48 of the positive contact terminal 42. Instead, as illustrated in FIG. 4, the jacket 20 falls short of reaching the peripheral flange 48. While the jacket 20 preferably does not make contact with the peripheral flange 48, it should be appreciated that the jacket 20 may overlap and extend onto the peripheral flange 48 provided the jacket 20 does not interfere with the operation of the pressure relief mechanism 40.

Figure 5:
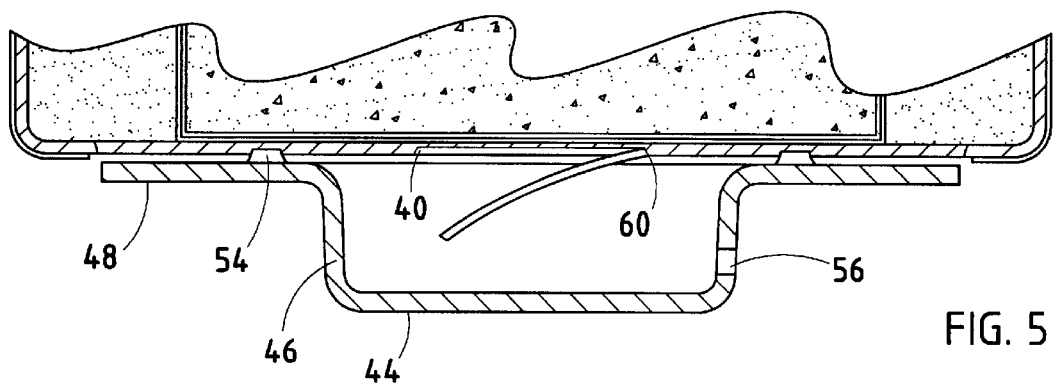
FIG. 5 is an enlarged cross-sectional view of the bottom portion of the electrochemical cell shown in FIG. 1 during a venting condition.

Accordingly, the stress concentration pressure relief mechanism 40 and positive contact terminal 42 of the present invention provides for a reliable vent mechanism for releasing high pressure gases during a venting occurrence of the cell 10. As seen in FIG. 5, the stress concentration groove 40 ruptures upon experiencing the predetermined pressure threshold, such that a portion of the end wall of steel can 12 is forced downward in the area generally enclosed by positive cover 42, and preferably remains connected at hinge 60. This allows for the escape of the pressurized gases from within the cell to the surrounding outside environment via the ruptured vent and openings 56. The stress concentrator groove 40 is formed in the steel can 12 which allows for the use of a low profile seal assembly for sealing the open end of the steel can 12, and results in significant reduction of bulging in the closed bottom end 14 of the steel can 12. In addition, the location of the welds 54 connecting the positive contact terminal 42 to the bottom end wall 14 of the can 12 is moved inward as close as possible so as to reduce the amount of stress that may otherwise adversely affect the venting pressure consistency. Further, the reduced size of the peripheral flange 48 of the positive contact terminal 42 reduces any interference with the venting operation that may otherwise be caused by the jacket 20 formed over the peripheral flange 48 of the cover 42. In addition, reduced size of the peripheral flange 48 further results in reduced material to form the cover 42, thereby resulting in a cost savings.

Figure 6:
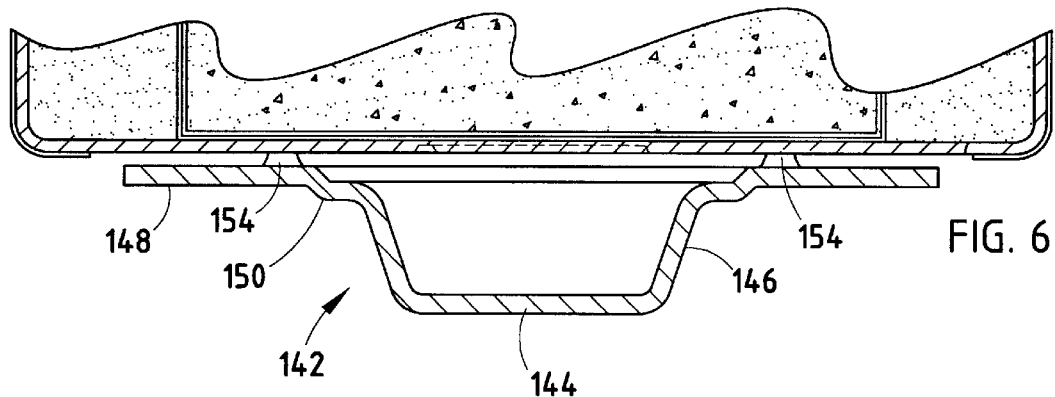
FIG. 6 is a cross-sectional view of the bottom portion of an electrochemical cell having a contact terminal cover according to another embodiment.

Referring to FIG. 6, a positive contact terminal (cover) 142 is shown welded on the closed bottom end of steel can for a different size battery according to a second embodiment of the present invention. The positive cover 142 likewise includes a peripheral flange 148 having a peripheral edge, and a protruding nubbin 144 having a substantially flat outer contact surface in a generally circular configuration. According to this embodiment, the positive cover 142 employs an angled upstanding wall 146 having an elevated rise angle of approximately twenty-one degrees, in contrast to the substantially vertical wall shown in the first embodiment. In addition, the positive cover 142 has a step 150 formed between the peripheral flange 148 and the upstanding wall 146. Accordingly, it should be appreciate that the positive cover 142 may employ a substantially vertical upstanding wall or a slightly angled wall, and may further employ one or more steps formed near or the peripheral flange, without departing from the teachings of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a container having a first end, a second end, a side wall extending between the first and second ends, and an end wall extending across the first end;
   a positive electrode comprising manganese dioxide disposed in said container;
   a negative electrode comprising zinc disposed in said container;
   an aqueous alkaline electrolyte disposed in said container;
   a pressure relief mechanism formed in the end wall of said container for releasing internal pressure from within said container when the internal pressure becomes excessive; and
   a cover positioned on the end wall of the container in electrical contact therewith and extending over said pressure relief mechanism, said cover including a peripheral flange with a peripheral edge and a protruding nubbin having a contact surface arid an upstanding wail between the contact surface and the peripheral flange;
   wherein the exterior of the upstanding wall is at a radial distance B, the cover is engaged with the end wall of the container at a location having a radial midpoint at a radial distance C, the exterior of the container side wall is at a radial distance E, radial distances B, C and E are measured from the central longitudinal axis of the cell, when E is greater than or equal to 0.170 inch, the difference C–B is equal to or less than the difference E–C, and when E is less than 0.170, 1.5 times the difference C–B is equal to or less than the difference E–C.

2. The electrochemical cell as defined in claim 1 further comprising a jacket applied to the exterior wall of the container and extending partially over the end wall of the container, wherein the peripheral edge of the flange is disposed radially inward of the jacket.

3. The electrochemical cell as defined in claim 1, wherein the peripheral edge of the flange is at a radial distance D and the difference C–B is equal to or less than the difference D–C.

4. The electrochemical cell as defined in claim 1, wherein the second end of the container comprises an open second end sealed closed with a collector and seal assembly.

5. The electrochemical cell as defined in claim 1, wherein said pressure relief mechanism comprises a stress concentration groove.

6. The electrochemical cell as defined in claim 1, wherein the cover is welded to the end wall of the container.

7. The electrochemical cell as defined in claim 1, wherein one of the positive and negative electrodes is formed against an interior surface of the container, and the other of the positive and negative electrodes is disposed within a cavity formed within said one of the positive and negative electrodes.

8. The electrochemical cell as defined in claim 1, wherein said cover comprises a positive contact terminal.

9. The electrochemical cell as defined in claim 1, wherein said cell is an AA-size electrochemical cell and the cover is connected to the end wall of the container at a location whose radial midpoint is about 0.140 inch from the center of the cover.

10. The electrochemical cell as defined in claim 1, wherein the cell is an AA-sized electrochemical cell and the peripheral flange of the cover has a maximum radius of about 0.230 inch.

11. The electrochemical cell as defined in claim 9, wherein the peripheral flange has a radius of about 0.225 inch.

12. The electrochemical cell as defined in claim 2, wherein said cover comprises a positive contact terminal.

13. The electrochemical cell as defined in claim 2, wherein one of the positive and negative electrodes is formed against an interior surface of the container, and the other of the positive and negative electrodes is disposed within a cavity formed within said one of the positive and negative electrodes.

14. The electrochemical cell as defined in claim 2, wherein said cell is an AA-size electrochemical cell and the cover is connected to the end wall of the container at a location whose radial midpoint is about 0.140 inch from the center of the cover.

15. The electrochemical cell as defined in claim 2, wherein the cell is an AA-sized electrochemical cell and the peripheral flange of the cover has a maximum radius of about 0.230 inch.

16. The electrochemical cell as defined in claim 15, the peripheral flange has a radius of about 0.225 inch.

17. The electrochemical cell as defined in claim 1, wherein the cell is an AA size cell and the cover is attached to the end wall of the container at a location whose radial midpoint is about 0.140 inch from the center of the cover such that the attachment location is substantially near the upstanding wall.

18. The electrochemical cell as defined in claim 17, wherein the cover is welded the end wall of the container.

19. The electrochemical cell as defined in claim 17 further comprising a jacket applied to the exterior wall of the container and extending partially over the end wall of the container, wherein the peripheral edge of the flange is disposed radially inward of the jacket.

20. The electrochemical cell as defined in claim 19, wherein the peripheral flange of the cover has a maximum radius of about 0.230 inch.

21. The electrochemical cell as defined in claim 20, wherein the peripheral flange has a radius of about 0.225 inch.

22. The electrochemical cell as defined in claim 1, wherein the peripheral flange of the cover has a maximum radius of about 0.230 inch; and the cell further comprises a jacket applied to the exterior surface of the container and extending over the end wall of the container, and the peripheral edge of the flange is disposed radially inward of the jacket.

23. The electrochemical cell as defined in claim 22, wherein the cover is attached to the end wall of a container at a location substantially near the upstanding wall.

* * * * *